(12) United States Patent
Valdes de la Garza

(10) Patent No.: US 11,975,845 B2
(45) Date of Patent: May 7, 2024

(54) PASSENGER SEAT ARMREST RECLINE MECHANISM

(71) Applicant: B/E Aerospace, Inc., Winston-Salem, NC (US)

(72) Inventor: Javier Valdes de la Garza, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 133 days.

(21) Appl. No.: 17/704,294

(22) Filed: Mar. 25, 2022

(65) Prior Publication Data

US 2023/0312107 A1 Oct. 5, 2023

(51) Int. Cl.
*B64D 11/06* (2006.01)

(52) U.S. Cl.
CPC ........ *B64D 11/0648* (2014.12); *B64D 11/064* (2014.12); *B64D 11/0641* (2014.12); *B64D 11/0644* (2014.12)

(58) Field of Classification Search
CPC ............ B64D 11/0648; B64D 11/0641; B64D 11/0644; B64D 11/064
See application file for complete search history.

(56) References Cited

U.S. PATENT DOCUMENTS

| | | | |
|---|---|---|---|
| 4,881,778 A | 11/1989 | Stephenson et al. | |
| 4,946,226 A | 8/1990 | Hurn et al. | |
| 6,361,114 B1 | 3/2002 | Rumler | |
| 7,182,404 B2 | 2/2007 | Laurent | |
| 8,328,286 B2 | 12/2012 | Steury et al. | |
| 8,534,759 B2 | 9/2013 | Garza et al. | |
| 9,174,737 B2 | 11/2015 | Beroth et al. | |
| 10,450,072 B2 | 10/2019 | Garza | |
| 10,773,613 B2 | 9/2020 | Nakamura et al. | |
| 10,829,018 B2 | 11/2020 | Burton et al. | |
| 2003/0080597 A1 | 5/2003 | Beroth et al. | |
| 2012/0074751 A1 | 3/2012 | Garza et al. | |
| 2020/0047890 A1 | 2/2020 | Simpson et al. | |

FOREIGN PATENT DOCUMENTS

| | | |
|---|---|---|
| DE | 102018210792 A1 | 1/2020 |
| DE | 102020121375 A1 | 2/2021 |
| EP | 1366987 A1 | 12/2003 |
| WO | 2006040600 A1 | 4/2006 |

OTHER PUBLICATIONS

Extended European Search Report dated Jul. 31, 2023; European Application No. 23163748.9.

*Primary Examiner* — Anthony D Barfield
(74) *Attorney, Agent, or Firm* — Suiter Swantz IP

(57) ABSTRACT

A passenger seat for an aircraft is described. The passenger seat is configurable between an upright position and a bed position. The upright position may be provided for taxi, take-off and landing events. The bed position, also referred to as a lie-flat position, is provided for long-haul travel in comfort. The passenger seat includes a seat pan, a seatback, and an armrest. The seat pan, the seatback, and the armrest form a kinematic chain by a number of pivot joints. The passenger seat also includes a linkage connecting the seat pan and the armrest. By the linkage, the armrest follows a motion of the seat pan when the passenger seat is reconfigured.

15 Claims, 10 Drawing Sheets

100

100

PASSENGER SEAT ARMREST RECLINE MECHANISM

TECHNICAL FIELD

The present invention generally relates to aircraft seating, and more specifically to reclining mechanisms for aircraft seating.

BACKGROUND

Business class airline passenger seats are typically adjustable between upright and lie-flat positions to provide passenger comfort and comply with taxi, take-off and landing seating position requirements. Such passenger seats typically include a seatback and seat pan, often linked in motion, supported by a frame and angularly adjustable by way of a seat recline mechanism. Conventional passenger seats typically include an adjustable or fixed armrest. The trend in commercial business class is seats that articulate to form a full flat bed. In the vast majority of the business class seats, as the seat translates forward from upright to a bed mode the armrest does not follow this motion and remains in the same location. This creates a problem because as the seat is moving forward the usable portion of the armrest gets smaller and smaller. Ideally, you want to have armrests that are part of the seat and move with the seat pan. Therefore, it would be advantageous to provide a device, system, and method that cures the shortcomings described above.

SUMMARY

A passenger seat is disclosed, in accordance with one or more embodiments of the present disclosure. In one illustrative embodiment, the passenger seat includes a seat pan including a housing and bracket fixed to the housing. In another illustrative embodiment, the passenger seat includes a seatback. In another illustrative embodiment, the seat pan and the seatback including a first pivot joint by which the seatback is pivotally connected to the seat pan. In another illustrative embodiment, the passenger seat includes an armrest. In another illustrative embodiment, the armrest includes a brace fixed to the armrest. In another illustrative embodiment, the brace and the seatback including a second pivot joint by which the armrest is pivotally connected to the seatback. In another illustrative embodiment, the passenger seat includes a linkage connected between the seat pan and the armrest. In another illustrative embodiment, the bracket and the linkage including a third pivot joint by which the linkage is pivotally connected to the seat pan. In another illustrative embodiment, the brace and the linkage including a fourth joint by which the linkage is pivotally connected to the armrest. In another illustrative embodiment, the passenger seat is configurable between an upright position and a bed position. In another illustrative embodiment, the linkage is disposed within the housing. In another illustrative embodiment, an angle of the seat pan is adjusted as the passenger seat is configured between the upright position and the bed position. In another illustrative embodiment, the armrest follows the seat pan by the linkage.

An aircraft is disclosed, in accordance with one or more embodiments of the present disclosure. In one illustrative embodiment, the aircraft includes a floor. In another illustrative embodiment, the aircraft includes a plurality of passenger seats. In another illustrative embodiment, each of the plurality of passenger seats includes a spreader mounted to the floor. In another illustrative embodiment, each of the plurality of passenger seats includes a seat pan including a bracket fixed to the seat pan. In another illustrative embodiment, each of the plurality of passenger seats includes a seatback. In another illustrative embodiment, the seat pan and the seatback including a first pivot joint by which the seatback is pivotally connected to the seat pan. In another illustrative embodiment, each of the plurality of passenger seats includes an armrest. In another illustrative embodiment, the armrest including a housing and a brace fixed to the housing. In another illustrative embodiment, the brace and the seatback including a second pivot joint by which the armrest is pivotally connected to the seatback. In another illustrative embodiment, each of the plurality of passenger seats includes a linkage connected between the seat pan and the armrest. In another illustrative embodiment, the bracket and the linkage including a third pivot joint by which the linkage is pivotally connected to the seat pan. In another illustrative embodiment, the brace and the linkage including a fourth joint by which the linkage is pivotally connected to the armrest. In another illustrative embodiment, the linkage is disposed within the housing. In another illustrative embodiment, the passenger seat is configurable between an upright position and a bed position. In another illustrative embodiment, an angle of the seat pan is adjusted as the passenger seat is configured between the upright position and the bed position. In another illustrative embodiment, the armrest follows the seat pan by the linkage.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
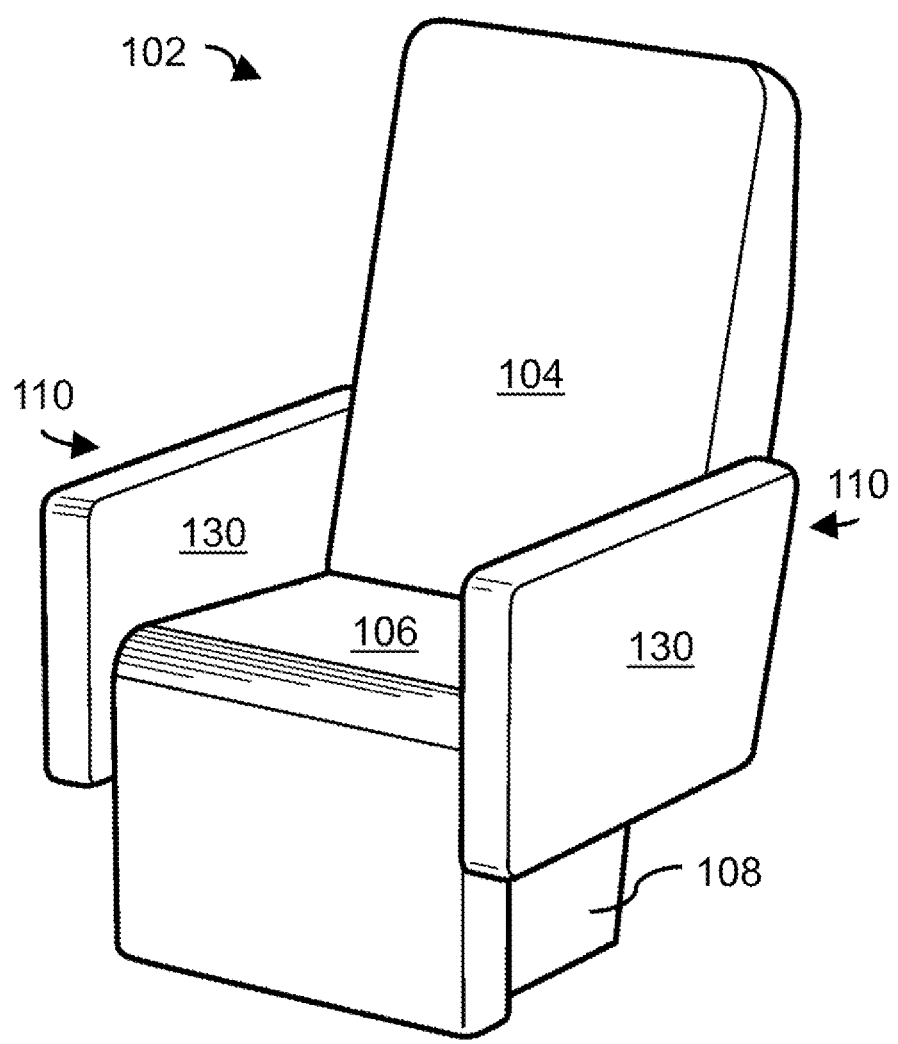
FIG. 1 depicts a perspective view of a passenger seat in an upright position, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a passenger seat including an armrest recline mechanism that causes the armrests to follow the seat pan. The armrest recline mechanism includes a linkage connecting the armrest with the seat pan, thereby causing the armrest to follow the motion of the seat pan. The linkage is constructed such that the armrest is aligned with the seat pan when the passenger seat is in a bed position (also referred to as a lie-flat position). By keeping the armrest aligned with the seat pan, such component may be parallel or substantially parallel (e.g., as parallel as possible) through positions in the translation. The linkage also provides smooth kinematic motion for the armrest as the seat transitions between the bed position and an upright position (also referred to as a taxi, takeoff, and landing (TTOL) position). The armrest may also maintain an aligned relationship (e.g., substantially parallel) to the seat pan over a portion of the followed motion.

An aircraft passenger seat is described in U.S. Pat. No. 8,534,759, titled "PASSENGER SEAT ARMREST RECLINE MECHANISM", which is incorporated herein by reference in the entirety.

Referring now to FIG. 1, a perspective view of a passenger seat 102 in an upright position is described, in accordance with one or more embodiments of the present disclosure. One or more of the passenger seats 102 may be coupled to a floor 109 of an aircraft 100. The passenger seat 102 includes a seatback 104 and a seat pan 106. The seatback 104 may include an upper portion and a lower portion. The passenger seat 102 also includes a spreader 108 (also referred to as a seat support structure, a seat chassis, and the like) that is configured to mount to a floor 109 of the aircraft 100 for providing structural support to various components of the passenger seat 102, such as the seat pan 106 and the seatback 104. The spreader 108 may be coupled to the floor 109 by a track (e.g., an anti-rattle track), or the like. Multiple of the spreaders 108 (e.g., a left spreader and a right spreader) may be connected by a transverse tube (not depicted). In embodiments, the seatback 104 and the seat pan 106 may be separate structures and/or may include one or more shared components. For example, the seatback 104 and the seat pan 106 can have a shared cushion or covering. In embodiments, one or more of the seatback 104 and the seat pan 106 may be configured to move. The seatback 104 and the seat pan 106 can be actuated such that the passenger seat 102 may be configurable between an upright position and a bed position. The passenger seat 102 may also include one or more armrests 110 (e.g., a left armrest and a right armrest). The armrest 110 may be pivotally connected to the seatback 104. The armrest 110 may include a housing 130 which protects a passenger from interacting with components disposed therein. The housing 130 of the armrest 110 may include a padded top surface on which the passenger may rest their arms. The housing 130 of the armrest 110 may also include a flat face on the interior sides of the passenger seat 102, and may be covered by a number of materials.

Referring now to FIGS. 2A-2G, a partial side view showing internal components of the passenger seat 102 as the passenger seat 102 transitions between an upright position and a bed position is described, in accordance with one or more embodiments of the present disclosure. The passenger seat 102 may include a brace 112, a linkage 120, a bracket 122, and one or more pivot joints (e.g., a pivot joint 114, a pivot joint 118, a pivot joint 124, a pivot joint 126). The term pivot joint may also be referred to herein as a pin joint, a revolute joint, or the like. Such pivot joints may generally be understood to include one degree of freedom allowing rotation about an axis. The pivot joints may permit relative rotational motion of the linkage 120 relative to the brace 112, the linkage 120 relative to the bracket 122, and the seat pan 106 relative to the seatback 104. The brace 112 may be provided in a rigid arrangement with the armrest 110 and the bracket 122 may be provided in a rigid arrangement with the seat pan 106. The seat pan 106 and the seatback 104 including a pivot joint 126 by which the seatback 104 is pivotally connected to the seat pan 106. Thus, as the seatback 104 pivots with respect to the seat pan 106 about the pivot joint 126 (e.g., when being configured between a bed position and an upright position), the linkage 120 pivots about the pivot joint 118 with respect to the brace 112 and pivots about the pivot joint 124 with respect to the bracket 122, thereby causing movement of the armrest 110. The armrest 110 then pivots with respect to the seatback 104 about the pivot joint 114. In embodiments, the relative movements of the rigid bodies about the pivot joint 114, the pivot joint 118, the pivot joint 124, and the pivot joint 126 may be kinematically represented as a four-bar linkage, which may be further coupled to a camming mechanism on the spreader 108 and a recline mechanism between the seat pan 106 and the seatback 104. Advantageously, the arrangement of the brace 112, the linkage 120, and the bracket 122 may provide for sufficient rotational motion in combination with the camming mechanism on the spreader 108 and the recline mechanism between the seat pan 106 and the seatback 104, to achieve the upright position and the bed position.

In embodiments, the armrest 110 includes the brace 112 fixed to the armrest 110. For example, the brace 112 may be fixed to the housing 130 of the armrest 110 by a fastener, adhesive, and the like. The brace 112 may then reinforce the armrest 110. The brace 112 may be fixed within the armrest 110 such that rotational motion of the brace 112 is imparted to the armrest 110. The brace 112 may also include one or more features for coupling the armrest 110 to other components of the passenger seat 102. In embodiments, the brace includes a pivot joint 114. The pivot joint 114 may be provided between the brace 112 and the seatback 104. In this regard, the brace 112 may pivot about the pivot joint 114 relative to the seatback 104. The brace 112 may also include a truss member 116 extending downwards from the pivot joint 114. The truss member 116 may be joined with the brace 112. The truss member 116 may be joined with the brace 112 during fabrication of the truss member 116, such as by injection molding, thermo forming, compression molding, or the like. In this regard, the truss member 116 may be formed as a constituent member of the brace 112. The truss member 116 may also be joined with the brace 112 by a fastener or the like. As depicted, the truss member 116 includes a triangular shape. The triangular shape of the truss member 116 may include a vertex. The truss member 116 may also include a pivot joint 118 disposed proximal to the vertex (e.g., at or offset to the side). The pivot joint 118 may be provided between the brace 112 and the linkage 120. In this regard, the brace 112 may pivot about the pivot joint 114 relative to the linkage 120. Although the brace 112 has been described as including the truss member 116 with the triangular shape, this is not intended as a limitation of the present disclosure. The brace 112 may include a number of shapes suitable for the pivot joint 114 and the pivot joint 118. However, the use of the truss member 116 may be advantageous in both providing sufficient strength for pivot joint 118 while also reducing a weight associated with brace 112.

In embodiments, the passenger seat 102 includes the linkage 120. The linkage 120 may be connected between the seat pan 106 and the armrest 110. The linkage 120 may be pivotably connected to the brace 112 at the pivot joint 118, such that the linkage 120 is pivotally connected to the armrest 110. The linkage 120 may also be pivotably connected to the bracket 122 at the pivot joint 124, such that the linkage 120 is pivotally connected to the seat pan 106. By such couplings, the linkage 120 may transmit motion between the seat pan 106 and the armrest 110 for causing the armrest 110 to rotate and be vertically displaced. The linkage 120 may generally include a rigid member for transmitting the motion with minimal bending.

In embodiments, the passenger seat 102 includes the bracket 122. The bracket 122 may include a first end and a second end connected to form a u-shape, such that the bracket 122 may be considered a u-shaped bracket. The first end of the bracket 122 may be fixed to the seat pan 106. Thus, the bracket 122 and the seat pan 106 may be considered a rigid body. The second end of the bracket 122 may include the pivot joint 124. In this regard, the linkage 120 may be pivotably coupled to the seat pan 106 by way of the pivot joint 124 and the bracket 122. The use of the u-shape for the bracket 122 may be advantageous for providing the bracket 122 with the ability to receive one or more components of the passenger seat 102, such as, but not limited to, the housing 130 of the armrest 110. In this regard, the bracket 122 may be provided within a hole of the housing 130, reducing a likelihood a passenger accessing the linkage 120 (e.g., a pinch point).

Figure 2A:
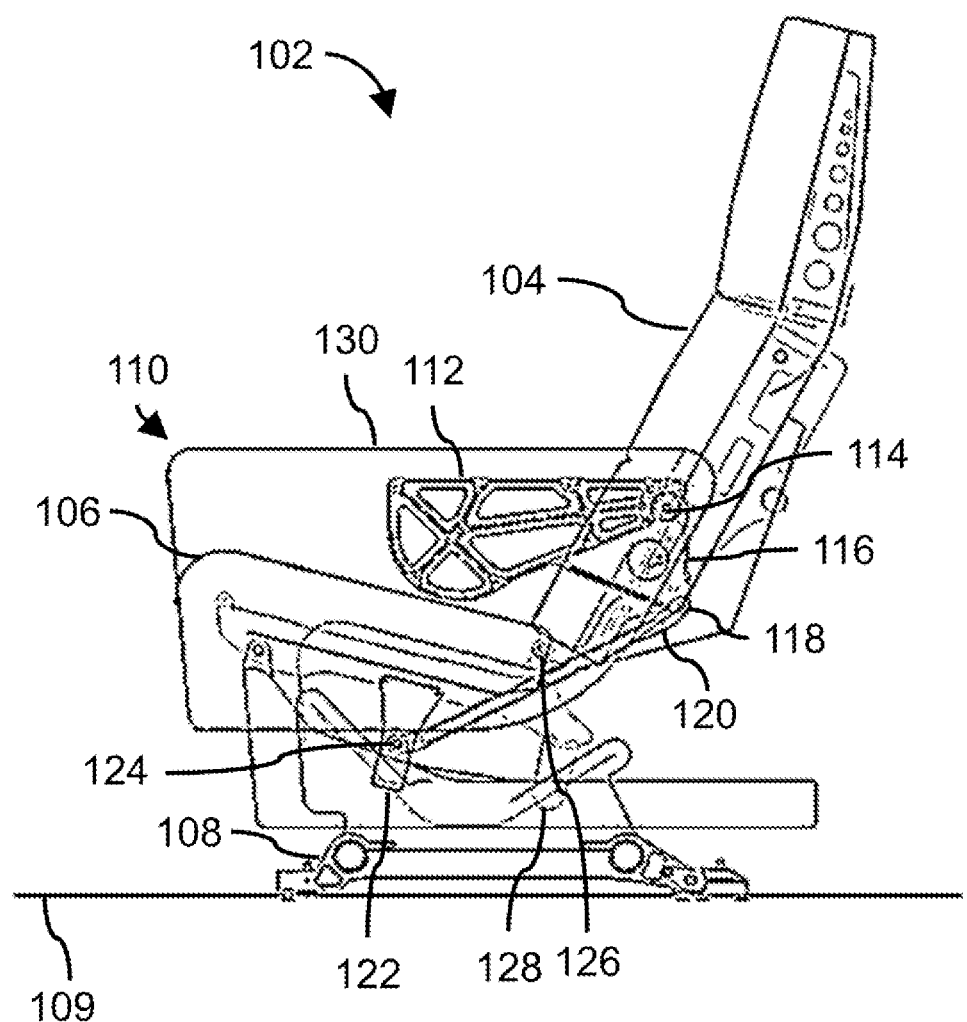
FIGS. 2A-2G depicts a side view of a passenger seat transitioning between an upright position and a bed position, in accordance with one or more embodiments of the present disclosure.
Figure 2B:
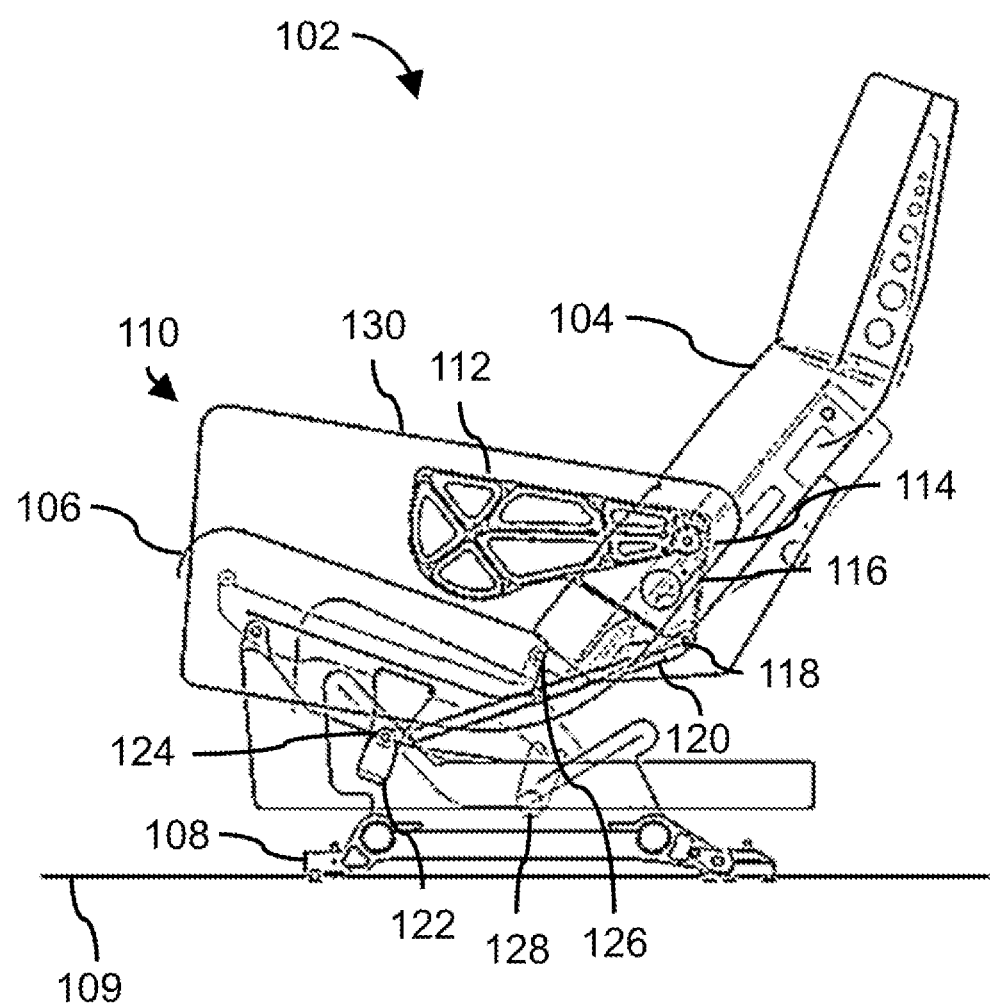
Figure 2C:
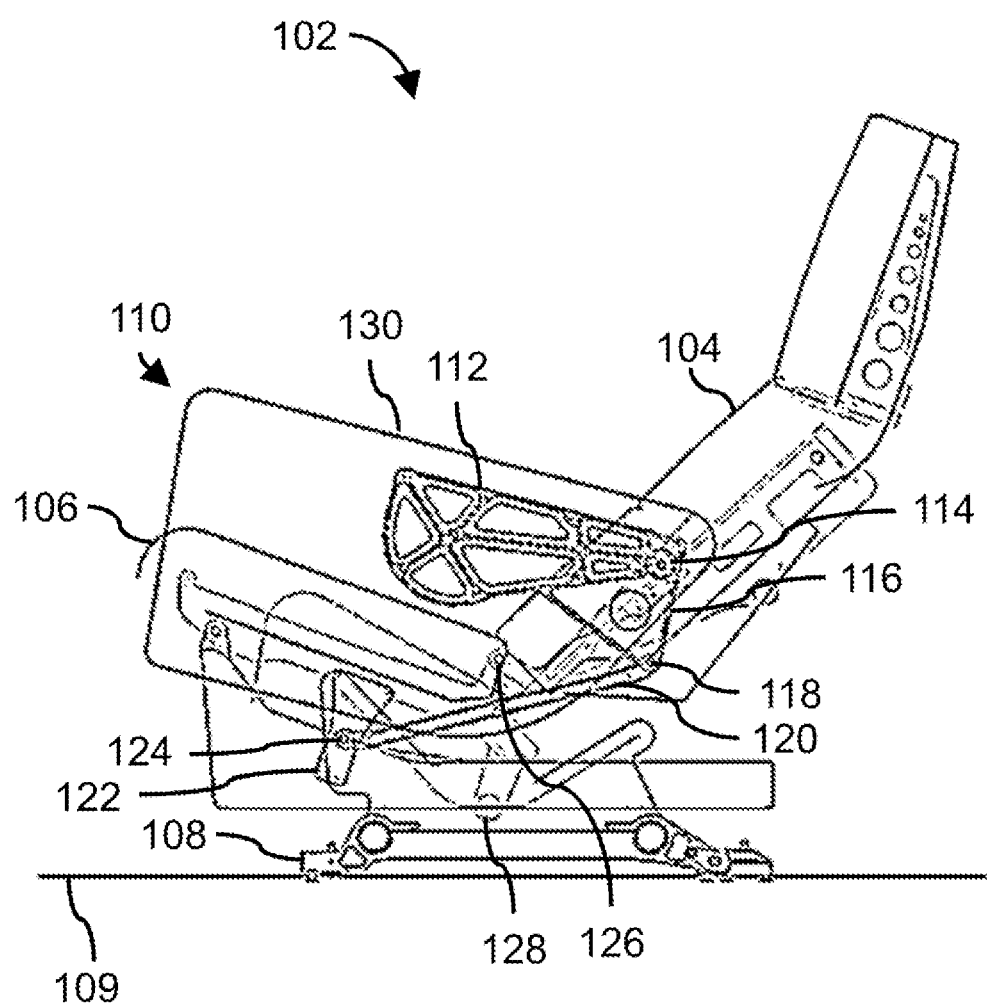
Figure 2D:
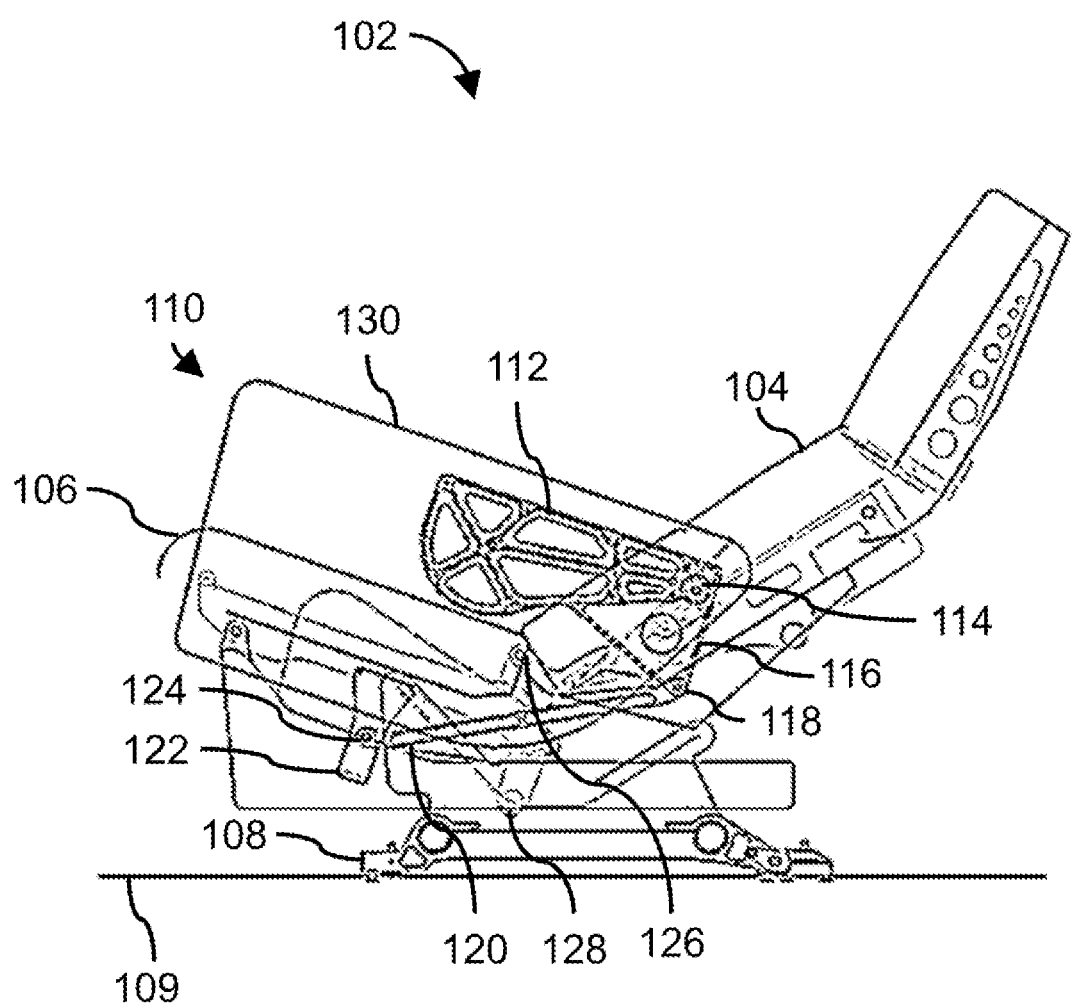
Figure 2E:
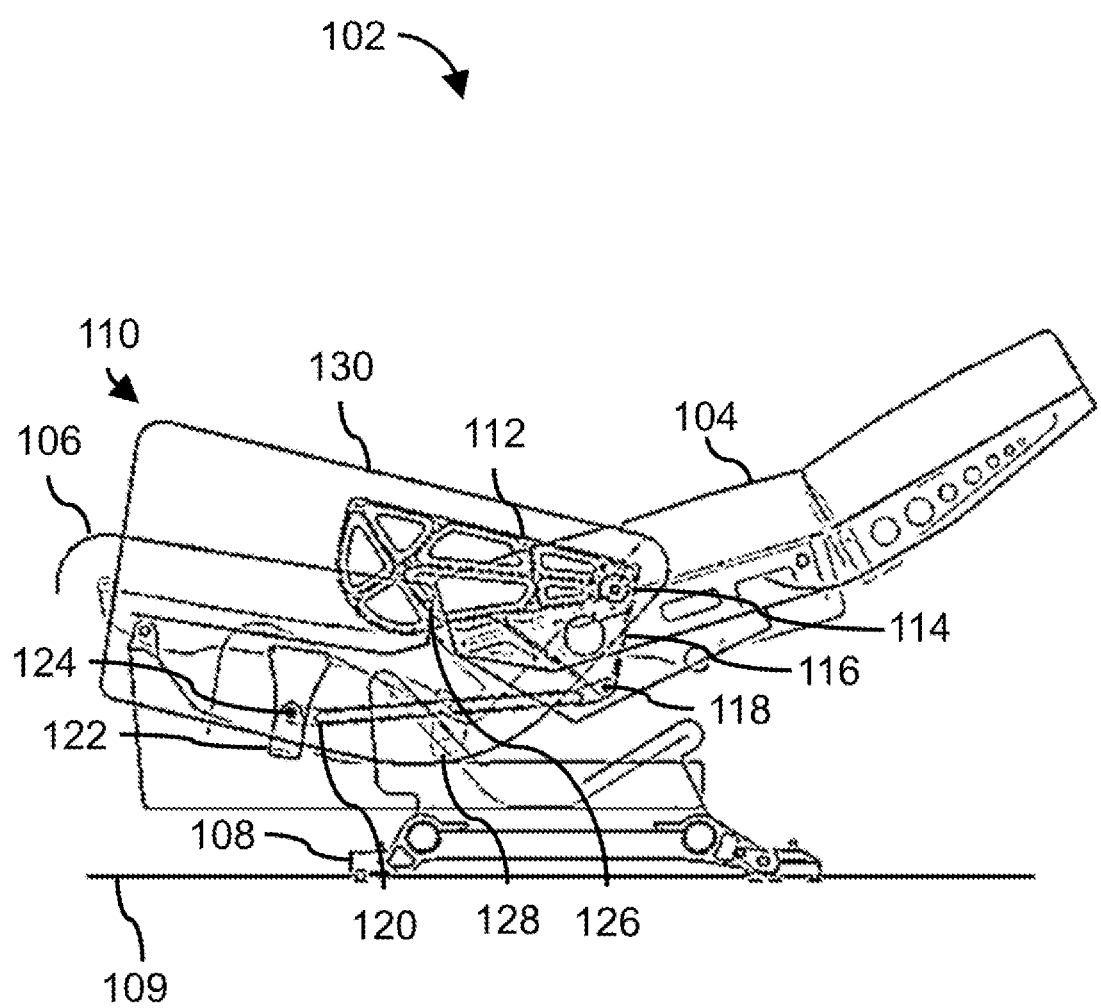
Figure 2F:
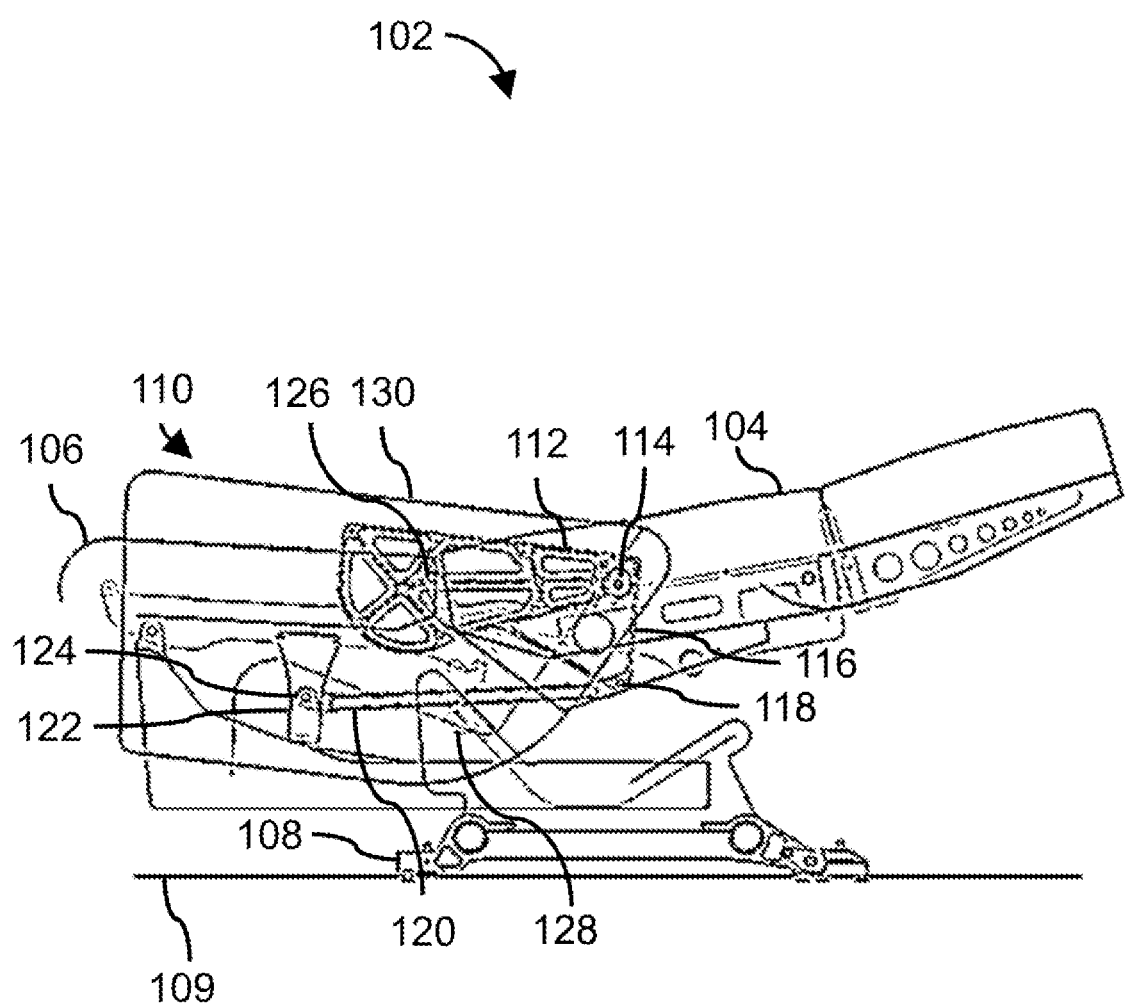
Figure 2G:
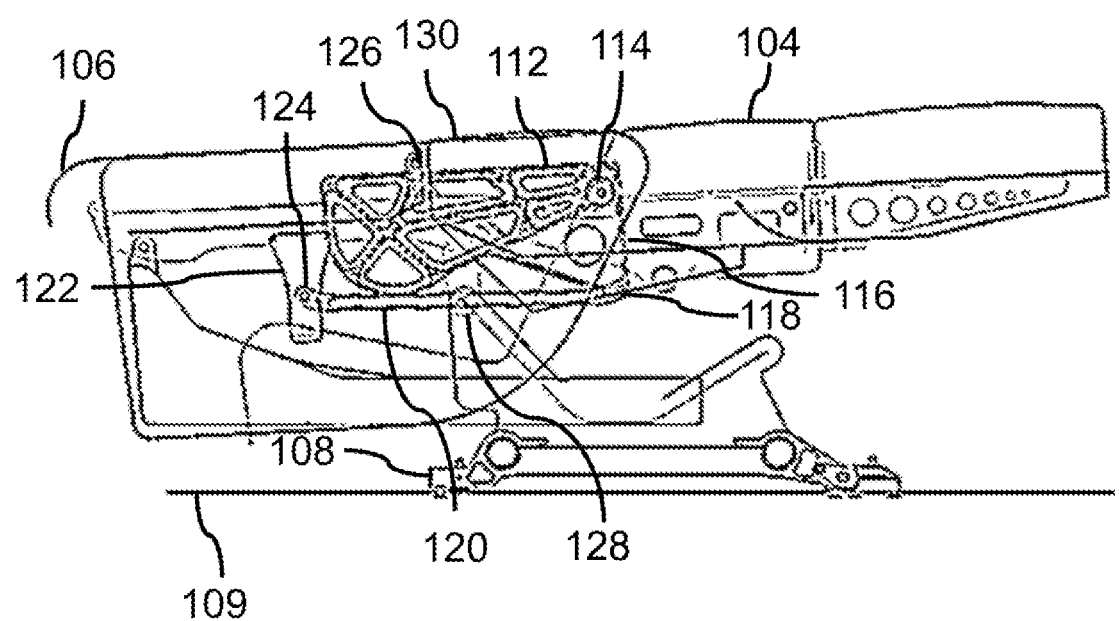

The spreader 108 may include a guide path 128 which acts as a linear cam. As may be understood, the term linear cam is meant to refer to a cam element which moves in a linear fashion along a slotted hole, a cammed surface, a guide path, or the like. The seat pan 106 may include a component, such as a roller, which interfaces with the guide path 128 to follow the guide path 128. Such roller may be in a fixed relation with the pivot joint 126. In some instances, the motive force which configures the passenger seat 102 between the upright position and the bed position may be provided by the guide path 128. For example, the guide path 128 may include a first end point and a second end point. The first end point of the guide path 128 may correspond to the upright position of the passenger seat 102, such that passenger seat 102 may be in the upright position when the follower of the seat pan 106 is disposed at the first end point, as depicted in FIG. 2A. Similarly, the second end point may correspond to the bed position of the passenger seat 102, such that passenger seat 102 may be in the bed position when the follower of the seat pan 106 is disposed at the second end point, as depicted in FIG. 2G. Thus, the seat pan 106 is configured to follow the guide path 128 between the first end point and the second end point as the passenger seat 102 is configured between the upright position and the bed position. The seat pan 106 may also configured to follow the guide path 128 between the second end point and the first end point as the passenger seat 102 is configured between the bed position and the seat position.

The guide path may include one or more angles. For example, the guide path may include a first angle, a second angle, and a third angle such that the guide path 128 includes a substantially arcuate shape. The first end point of the guide path may be disposed at the first angle and the second end point of the guide path may be disposed at the third angle, with the second angle joining the first angle and the second angle. The ends of the guide path 128 may be at a highest vertical point (i.e., the guide path opens upward) with the forward end being slightly higher than the rearward end. In this arrangement, the rear end of the seat pan 106 is lowest at mid recline to provide a cradling sitting position. A passenger seat is described in U.S. Pat. No. 9,174,737, titled "AIRCRAFT SEAT WITH TRANSLATING SEATBACK LINKAGE PIVOT", which is incorporated herein.

In embodiments, the arrangement, position, and lengths of the brace 112, the linkage 120, and the bracket 122 is selected to control the surfaces of one or more of the armrest 110, the seatback 104, or the seat pan 106 in one or more of the upright position, the bed position, and/or while translating between the upright position and the bed position. For example, FIG. 2A depicts, the top surface of the armrest being aligned with the floor when the passenger seat is configured in the upright position. By way of another example, FIGS. 2A-C depicts the top surface of the armrest including an offset angle from the top surface of the seat pan as the seat pan follows along the first angle and the second angle of the guide path. FIG. 2D further depicts the top surface of the armrest aligned with the top surface of the seat pan as the seat pan. By way of another example, FIGS. 2D-2G depicts the top surface of the armrest 110 aligned with the top surface of the seat pan 106 as the seat pan 106 follows along the third angle of the guide path 128. Such alignment may be due to the linkage 120 keeping parallelism between the seat pan 106 and armrest 110. By way of another example, FIGS. 2D-2F depicts the top surface of the armrest 110 and the top surface of the seat pan 106 at an offset angle from the floor 109 for a portion of the guide path 128 as the seat pan follows along the third angle of the guide path 128. FIG. 2G further depicts the top surface of the armrest 110 and the top surface of the seat pan 106 aligned when the passenger seat is configured in the bed position. This arrangement may be beneficial in providing a flat surface on which a passenger may sleep.

The arrangement described above thus provides for a smooth transition from the upright position, where the top surface of the seat pan 106 is offset from the armrest 110, to the bed position, where the top surface of the seat pan 106 is aligned with the top surface of the armrest 110. Advantageously, the armrest 110 is automatically raised and lowered by the linkage 120 as the passenger seat 102 is transitioned between the upright position and the bed position. Thus, the passenger does not need to manually raise or lower the armrest 110. Furthermore, the armrest 110 may be raised and lowered without requiring an electrical actuator, a hydraulic actuator, or the like. The linkage 120 may also be relatively light weight and include minimal translating components.

In these figures, the brace 112, the linkage 120, the bracket 122, and a camming surface of the spreader 108 are highlighted for clarity and emphasis, while some portions of the passenger seat 102, e.g., the seatback 104, the seat pan 106, or the armrest 110 are deemphasized. Other portions of the passenger seat 102, e.g., the recline mechanism for the seatback 104, are not shown to avoid confusion and unnecessary detail. The recline mechanism for the seatback 104 a linkage coupled between the seat pan 106 and the seatback 104, which motivates the seatback 104 into the bed position as the angle of the seat pan 106 is adjusted. Such linkage may include a pivot point in common with the seat pan 106, pivotably coupling the linkage to the seat pan 106. The linkage may also include a guide path which the seatback is configured to follow. For example, a recline mechanism for a seatback is described in U.S. Pat. No. 10,450,072, titled "SEATBACK ARTICULATION ASSEMBLY AND METHOD, which is incorporated herein by reference in the entirety.

Figure 3:
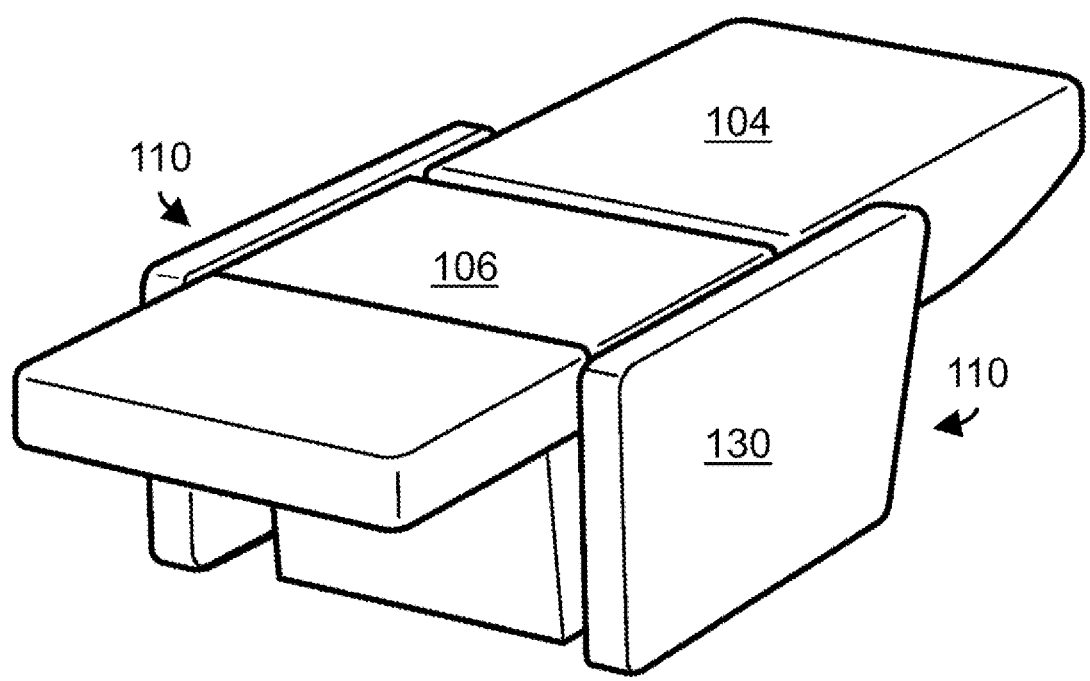
FIG. 3 depicts a perspective view of a passenger seat in a bed position, in accordance with one or more embodiments of the present disclosure.

Referring now to FIG. 3, the aircraft 100 including a perspective view of the passenger seat 102 in the bed position is described, in accordance with one or more embodiments of the present disclosure. As the passenger seat 102 is configured into the bed position, the top surface (e.g., the arm pad) of the housing 130 of the armrest 110 may be made to be in substantially the same plane as the top surface (e.g., the seat cushion) of the seat pan 106. The top surface of the housing 130 of the armrest 110 may also be made to be in substantially the same plane as the seatback 104.

Figure 4:
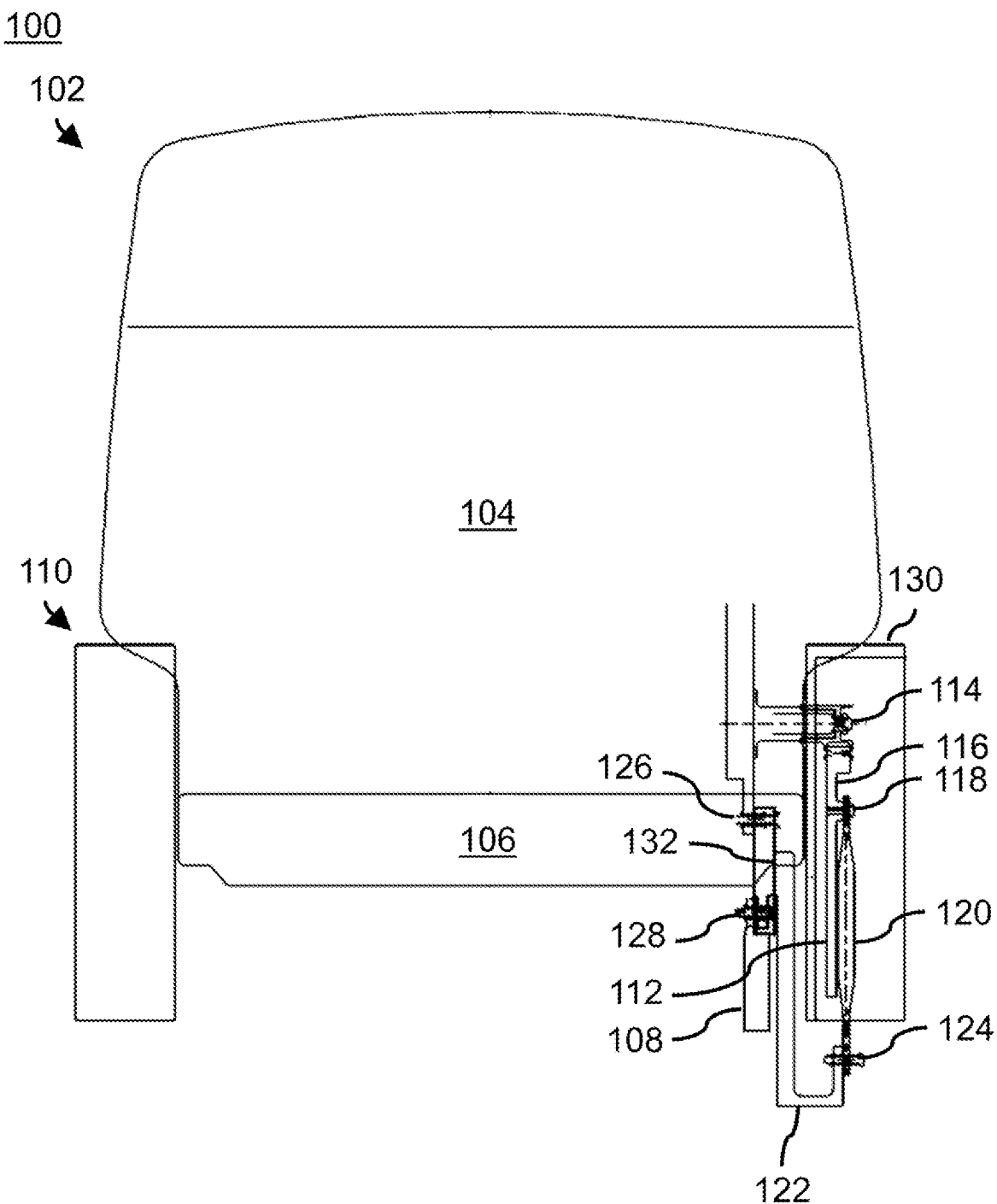
FIG. 4 depicts a partial front view of a passenger seat, in accordance with one or more embodiments of the present disclosure.

Referring now to FIG. 4, a partial front view of the passenger seat 102 is described, in accordance with one or more embodiments of the present disclosure. As depicted, the bracket 122 is formed as a u-shape with a first end of the bracket 122 fixed to the seat pan at a location 132 and with a second end including the pivot joint 124. The arrangement of the bracket 122 is advantageous in pivotally coupling the linkage 120 to the seat pan 106, while avoiding interference with the housing 130. In this regard, the housing 130 may maintain a flush interior surface, thereby preventing pinching. Furthermore, the linkage 120 may be maintained within the housing 130 as the passenger seat 102 transitions between the upright position and the bed position. Thus, the linkage 120 may be provided within the armrest 110 and cause the armrest to move with the seat pan 106, achieving a desired kinematic motion.

Referring generally again to FIGS. 1-4, although not depicted, one or more of the aircraft 100 and the passenger seat 102 may include a passenger control panel. The passenger control panel may include a switch (or the like) which may re-position or configure the passenger seat 102 into the bed position. Similarly, the passenger control panel may include a switch (or the like) which may re-position or configure the passenger seat 102 into the upright position. It is further noted that the passenger seat 102 may be actuated by engaging a handle that activates one or more mechanical assemblies for configuring the aircraft in the upright position and the bed position. Therefore, the above description should not be interpreted as a limitation on the scope of the disclosure but merely an illustration.

As used throughout the specification, the term "upright" seating position is used to describe a taxi, take-off and landing compliant seatback configuration, the term "reclined" seating position is used to describe a seating position in which the seatback is reclined relative to the upright seatback configuration, and the term "lie-flat" position is used to describe a configuration in which the seatback and seat bottom form a substantially flat and continuous surface.

It is noted that where the passenger seat 102 is installed within the aircraft 100, the passenger seat 102 may be configured in accordance with aviation guidelines and/or standards put forth by, but not limited to: the Federal Aviation Administration (FAA), the European Aviation Safety Agency (EASA), or any other flight certification agency or organization; the American National Standards Institute (ANSI) or any other standards setting organization or company; and the like.

Although much of the present disclosure is directed to the passenger seat 102 being installed within the aircraft 100 or aircraft cabin, it is noted herein the passenger seat 102 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Although one or more of the figures herein are shown and described with reference to a single side of the passenger seat 102 for purposes of clarity, it is understood that the passenger seat includes the various components described herein on each side of the seat which work in cooperation to adjust the seating position and the armrest position.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A passenger seat comprising:
a seat pan including a bracket fixed to the seat pan;
a seatback, the seat pan and the seatback including a first pivot joint by which the seatback is pivotally connected to the seat pan;
an armrest including a housing and a brace fixed to the housing, the brace and the seatback including a second pivot joint by which the armrest is pivotally connected to the seatback; and
a linkage connected between the seat pan and the armrest, the bracket and the linkage including a third pivot joint by which the linkage is pivotally connected to the seat pan, the brace and the linkage including a fourth pivot joint by which the linkage is pivotally connected to the armrest, wherein the linkage is disposed within the housing;
wherein the passenger seat is configurable between an upright position and a bed position; wherein an angle of the seat pan is adjusted as the passenger seat is configured between the upright position and the bed position; wherein the armrest follows the seat pan by the linkage;
wherein the bracket includes a first end and a second end connected to form a u-shape, wherein the first end of the bracket is fixed to the seat pan, wherein the second end of the bracket includes the third pivot joint.

2. The passenger seat of claim 1, wherein the housing maintains a flush interior surface.

3. The passenger seat of claim 1, the brace further including a truss member joined with the brace and extending downwards from the second pivot joint, wherein the truss member includes the fourth pivot joint.

4. The passenger seat of claim 3, wherein the truss member includes a triangular shape with a vertex, wherein the truss member includes the fourth pivot joint proximal to the vertex.

5. The passenger seat of claim 1, further comprising a spreader configured to mount to a floor of an aircraft, the spreader including a guide path with a first end point and a second end point; the first end point corresponding to the upright position; the second end point corresponding to the bed position; wherein the seat pan is configured to follow the guide path between the first end point and the second end point as the passenger seat is configured between the upright position and the bed position.

6. The passenger seat of claim 5, wherein a top surface of the housing is substantially parallel to a top surface of the seat pan when the passenger seat is configured in the bed position.

7. The passenger seat of claim 6, wherein the top surface of the housing is substantially parallel with the floor when the passenger seat is configured in the upright position; wherein the top surface of the housing is substantially parallel with the floor when the passenger seat is configured in the bed position.

8. The passenger seat of claim 6, wherein the guide path includes a first angle, a second angle, and a third angle; the first end point of the guide path disposed at the first angle; the second end point of the guide path disposed at the third angle; the second angle joining the first angle and the second angle.

9. The passenger seat of claim 8, wherein the top surface of the housing is substantially parallel to the top surface of the seat pan as the seat pan follows along the third angle of the guide path.

10. The passenger seat of claim 9, wherein the top surface of the housing and the top surface of the seat pan includes an offset angle from the floor for a portion of the guide path as the seat pan follows along the third angle of the guide path.

11. The passenger seat of claim 10, wherein the top surface of the housing includes an offset angle from the top surface of the seat pan as the seat pan follows along the first angle and the second angle of the guide path.

12. The passenger seat of claim 1, further comprising an additional linkage coupled between the seat pan and the seatback, the additional linkage motivating the seatback into the bed position as the angle of the seat pan is adjusted.

13. An aircraft comprising:
a floor; and
at least one passenger seat including:
a spreader mounted to the floor;
a seat pan including a bracket fixed to the seat pan;
a seatback, the seat pan and the seatback including a first pivot joint by which the seatback is pivotally connected to the seat pan;
an armrest, the armrest including a housing and a brace fixed to the housing, the brace and the seatback including a second pivot joint by which the armrest is pivotally connected to the seatback;
a linkage connected between the seat pan and the armrest, the bracket and the linkage including a third pivot joint by which the linkage is pivotally connected to the seat pan, the brace and the linkage including a fourth pivot joint by which the linkage is pivotally connected to the armrest, wherein the linkage is disposed within the housing;
wherein the passenger seat is configurable between an upright position and a bed position; wherein an angle of the seat pan is adjusted as the passenger seat is configured between the upright position and the bed position; wherein the armrest follows the seat pan by the linkage;
wherein the bracket includes a first end and a second end connected to form a u-shape, wherein the first end of the bracket is fixed to the seat pan, wherein the second end of the bracket includes the third pivot joint.

14. The aircraft of claim 13, wherein the housing maintains a flush interior surface.

15. The aircraft of claim 13, the brace further including a truss member joined with the brace and extending downwards from the second pivot joint, wherein the truss member includes the fourth pivot joint.

* * * * *